United States Patent
Oshiro et al.

[11] Patent Number: 5,995,897
[45] Date of Patent: Nov. 30, 1999

[54] VEHICLE CONTROL METHOD USING SHORT-TERM AND LONG-TERM CORRECTION COEFFICIENTS TO DETERMINE TURN STATUS

[75] Inventors: Hiroshi Oshiro; Keiji Toyoda; Noriyuki Takemasa, all of Hamakita, Japan

[73] Assignee: Nisshinbo Industries Inc., Tokyo, Japan

[21] Appl. No.: 08/838,574

[22] Filed: Apr. 10, 1997

[30] Foreign Application Priority Data

May 1, 1996 [JP] Japan .................................... 8-134416

[51] Int. Cl.[6] .............................. B60K 28/16; G01P 3/56
[52] U.S. Cl. ............................................. 701/72; 303/169
[58] Field of Search .................................. 701/72, 41, 42, 701/43; 303/147, 169; 324/161

[56] References Cited

U.S. PATENT DOCUMENTS

| | | | |
|---|---|---|---|
| 5,292,184 | 3/1994 | Takata | 303/100 |
| 5,490,070 | 2/1996 | Kiryu et al. | 364/426.02 |
| 5,498,072 | 3/1996 | Shimizu | 303/191 |
| 5,691,900 | 11/1997 | Luckevich | 364/424.051 |
| 5,699,251 | 12/1997 | Mori et al. | 364/426.045 |
| 5,700,074 | 12/1997 | Sugimoto et al. | 303/186 |
| 5,725,067 | 3/1998 | Ikeda et al. | 180/197 |
| 5,734,265 | 3/1998 | Toyoda et al. | 324/161 |
| 5,852,788 | 12/1998 | Toyoda et al. | 701/74 |

*Primary Examiner*—Michael Zanelli
*Attorney, Agent, or Firm*—Nikaido, Marmelstein, Murray & Oram LLP

[57] ABSTRACT

A method is provided for accurately controlling a vehicle having a mini tire mounted as the spare tire. A short-term correction coefficient and a long-term correction coefficient are computed periodically for the left and right wheels, and a probable lateral acceleration G is computed from the difference between the ratio of the short-term correction coefficient to the long-term correction coefficient for the left and right wheels. A revised probable lateral acceleration G' is computed using the value of the long-term correction coefficient fixed at the point at which the absolute value of the probable lateral acceleration G has exceeded a prescribed value and the most recent short-term correction coefficient, from which a decision is made as to the state of a turn. The most recent long-term correction coefficient is used to make a correction for a mounted mini tire.

3 Claims, 6 Drawing Sheets

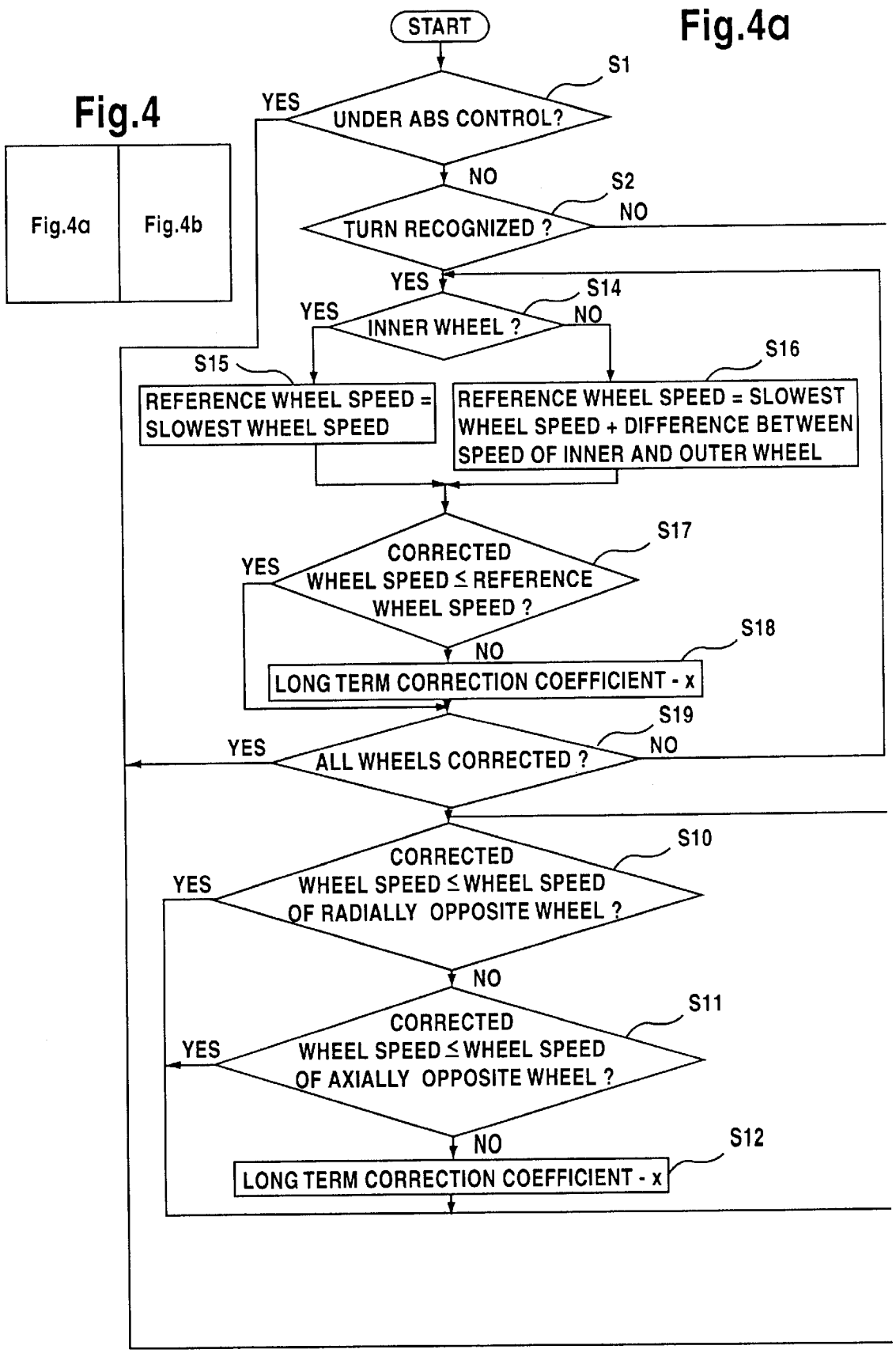

VEHICLE CONTROL METHOD USING SHORT-TERM AND LONG-TERM CORRECTION COEFFICIENTS TO DETERMINE TURN STATUS

BACKGROUND OF THE INVENTION

This invention relates to a method for controlling a vehicle equipped with a mini tire as the spare tire.

Conventionally, to make a definitive recognition that a vehicle is turning, the ratio of a short-term correction coefficient to a long-term correction coefficient is determined for the left and right non-drive wheels, and a probable lateral acceleration G is computed from the difference in these ratios. If it is doubtful that the vehicle is turning, computation of the long-term correction coefficient is suspended, and a probable lateral acceleration G is computed using the long-term correction coefficient fixed in value as computed at the point of suspension and a short-term correction coefficient re-computed periodically.

In this method, in the event that a turn is in doubt, for example, when an antilock control operation is to be performed, the vehicle cannot be controlled accurately since the long-term correction coefficient fixed at the point of suspension is being used.

OBJECTION AND SUMMARY OF THE INVENTION

This invention was designed to resolve the aforementioned problem. To that end, it is an object of the present invention to provide an accurate method for controlling a vehicle equipped with a mini tire as the spare tire.

To achieve this object, this invention is a method for controlling a vehicle, in which the speed of each wheel of the vehicle is measured, and a short-term correction coefficient and a long-term correction coefficient are both computed periodically for the left and right tires. A probable lateral acceleration G is computed from the difference between the ratio of the short-term correction coefficient to the long-term correction coefficient so derived for each of the left and right tires. Then a revised probable lateral acceleration G' by which to judge the actual turn state is computed using the value of the long-term correction coefficient fixed at the threshold point at which a turn is deemed doubtful and the most recent short-term correction coefficient, and if a turn is judged not to have been made, the vehicle is controlled using the most recent long-term correction coefficient.

Further, this invention is a method, as described above, for controlling a vehicle equipped with a mini tire as the spare tire, wherein if a turn is judged not to have been made, the vehicle is controlled by using the most recent long-term correction coefficient to correct for the mounted mini tire.

Also, this invention is a method for controlling a vehicle as indicated above, wherein if a turn is judged not to have been made, an antilock brake control operation is performed using the most recent long-term correction coefficient.

This invention provides an advantage as follows. Conventionally, if a wheel is slipping or it is doubtful that the vehicle is turning, then computation of the long-term correction coefficient is suspended. In this invention, if a turn is not recognized during the decision-making process of a doubtful turn, the most recent long-term correction coefficient is used without fail to correct the wheel speeds. This ensures an accurate control of the vehicle whether the wheels are slipping upon take-off, or whether the vehicle is making a turn.

BRIEF DESCRIPTION OF THE DRAWINGS

The above and other objects and the attendant advantages of the present invention will become readily apparent by reference to the following detailed description when considered in conjunction with the accompanying drawings wherein.

PREFERRED EMBODIMENT OF INVENTION

An example of this invention is explained next with reference to the drawings.

Figure 1:
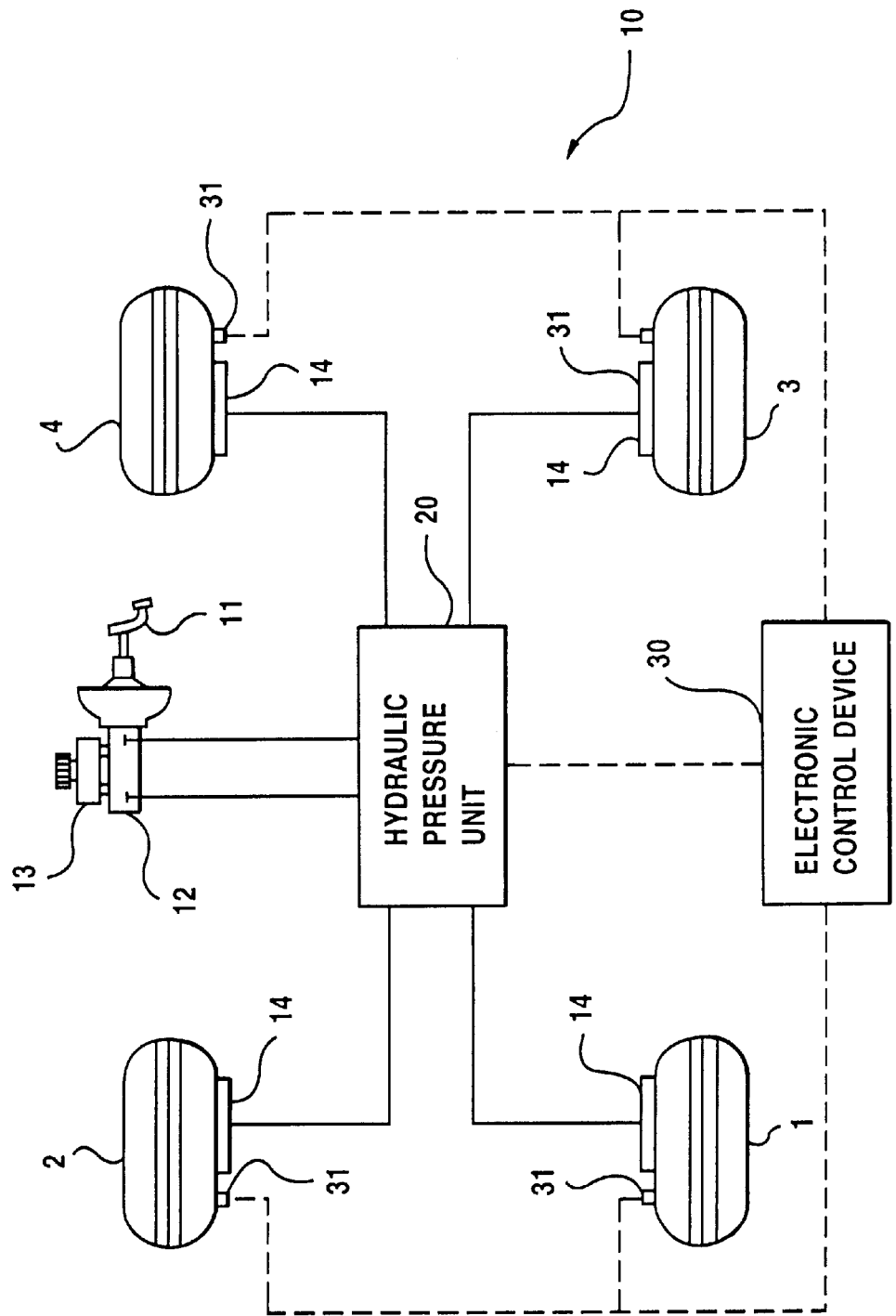
FIG. 1 illustrates a partial overview of an antilock brake control device.

A brake control device suitable to be used with the present invention is shown in FIG. 1.

During normal braking, when the driver presses the brake pedal 11, brake fluid is supplied from the main reservoir 13 to generate brake pressure at the master cylinder 12. The brake pressure so generated is applied to the inlet valve 23 installed in the main brake line and to the respective wheel cylinder 14 of each wheel 14 to brake the vehicle.

Should, for example, the brake pedal be pressed hard causing the wheels to slip, the antilock brake control (ABS) device 10 is activated. The electronic control device 30 computes a computed wheel speed and a probable vehicle speed based on signals from the wheel speed sensors 31 to determine the state of slippage of each wheel. It then controls the operation of the ABS hydraulic pressure unit 20 as a function of the state of slippage of each individual wheel in order to prevent each wheel 1–4 from locking.

The electronic control device 30 can be a customized hardware device, or can be configured from an input device, processor, output device, and other general computer components with appropriate software to carry out the described functions.

Figure 2:
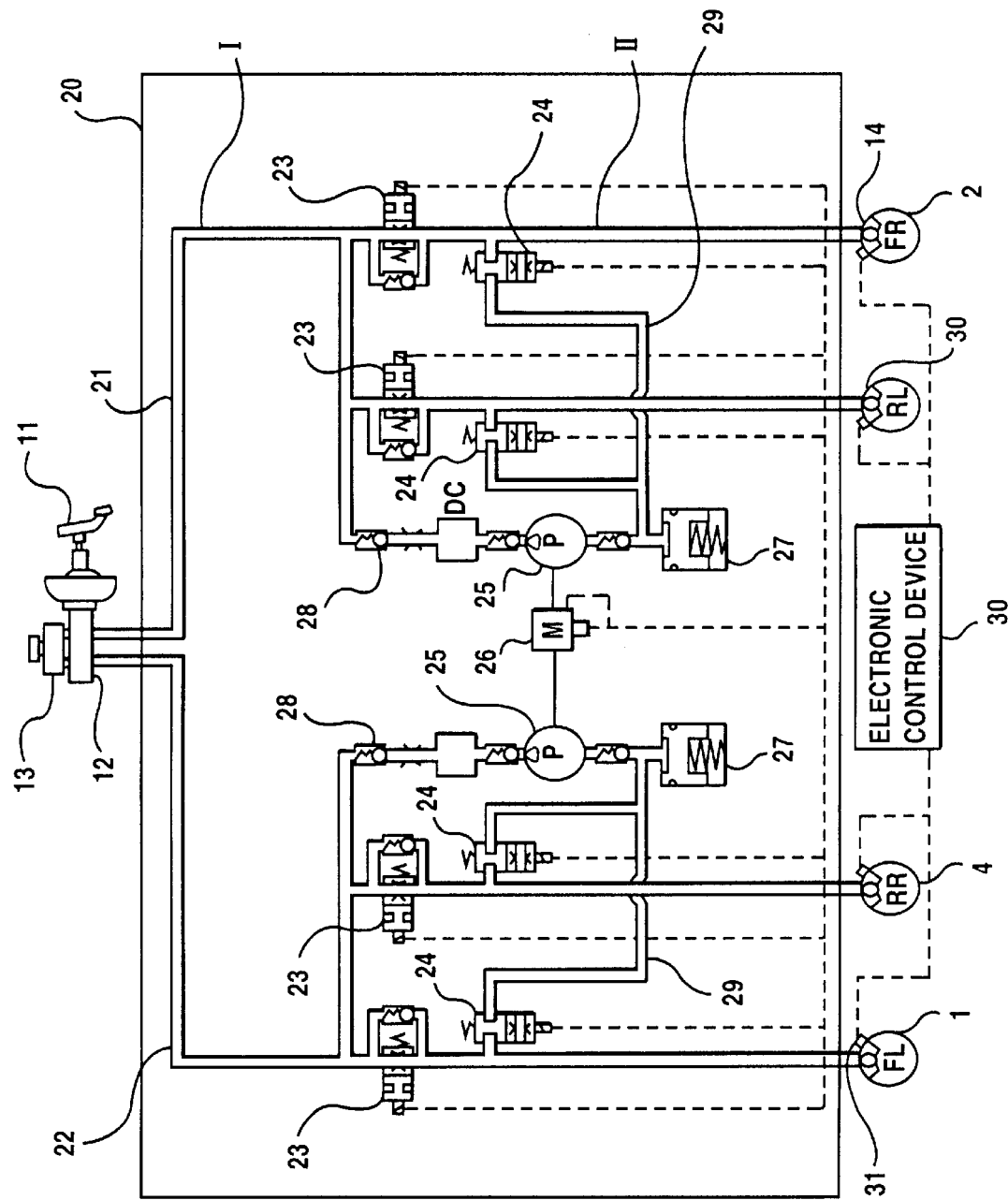
FIG. 2 illustrates the brake lines of an antilock brake control device.

FIG. 2 illustrates a brake system which has two independent brake lines, first main brake line 21 and second main brake line 22, arranged diagonally through the master cylinder 12.

The main reservoir 13 stores the brake fluid supplied to the master cylinder 12. The first main brake line 21 is connected to the wheel cylinders 14, 14 of the right front wheel 2 and left rear wheel 3 via the inlet valve 23, 23, and via the outlet valves 24, 24 to the auxiliary reservoir 27. Similarly, the second main brake line 22 is connected to the wheel cylinders 14, 14 of the right rear wheel 4 and left front wheel 1 via the inlet valves 23, 23, and via the outlet valves 24, 24 to the auxiliary reservoir 27. During an antilock control action, brake fluid from the auxiliary reservoir 27 is returned by the pump 25, driven by the motor 26, to the main brake lines via dumping chambers and check valves 28.

If the diameter of a particular wheel changes because the tire tread is worn or because the spare mini tire has been mounted, then the actual wheel speed will differ from the computed wheel speed as determined from the wheel sensor.

A correction must be made for this difference, for which there are a number of methods.

For example, in one simple method, the slowest wheel speed is set as the reference from which a correction coefficient is computed for the other wheels. Specifically, the computed wheel speed of a given wheel is multiplied by the correction coefficient to derive a corrected wheel speed which is compared to the slowest wheel speed. If the corrected wheel speed is greater than the slowest wheel speed, a prescribed number is subtracted from the correction coefficient to reduce its value. This operation is repeated periodically to adjust the correction coefficient from which to revise the corrected wheel speed such that it will match the slowest wheel speed.

The correction coefficient is computed for two different periods; a short-term period of, for example, 0.01 seconds, and a long-term period of, for example, 0.1 seconds.

Figure 3:
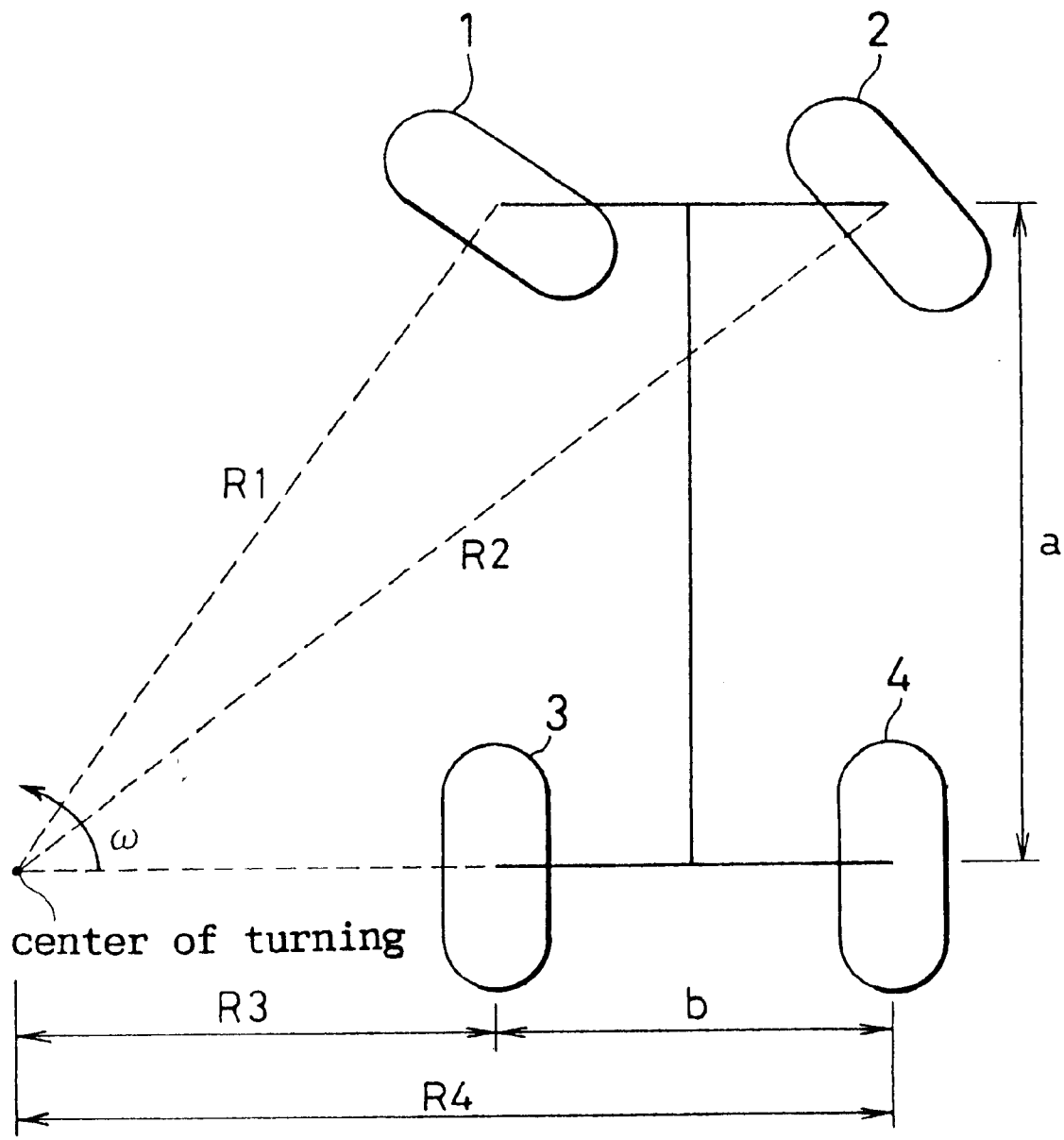
FIG. 3 illustrates the state of the wheels when a vehicle is making a left turn.

The short-term correction coefficient is derived from a short period, hence it is greatly affected by the instantaneous state of a wheel, such as occurs when the vehicle is turning as shown in FIG. 3. That is, the left and right wheel speeds are identical if the vehicle is on a straight path, but once the vehicle enters a turn, the turning radius of each wheel is different, wherein the left and right wheel speeds differ. As a result, the short-term correction coefficient can be utilized to determine the state of a turn.

In contrast, the long-term correction coefficient is computed from a longer period, and therefore, reflects an averaged operational state. As such, the long-term correction coefficient corrects for the variation from the real wheel speed arising from the diameter of the wheel, such as when the mini tire is mounted, and the state of the vehicle. This does not apply, however, in exceptional operating circumstances.

The probable lateral acceleration G can be computed, for example, by the equation as shown below in Formula 1, in which the ratio of the short-term correction coefficient to the long-term correction coefficient of the right wheel is subtracted from the ratio of the short-term correction coefficient to the long-term correction coefficient of the left wheel, and the value so obtained is multiplied by a variable. The correction coefficients will vary as a function of the diameter of the wheels, but that variation is cancelled by taking the ratio of the short-term and long-term correction coefficients. For that reason, since the probable lateral acceleration G is a function of the short-term correction coefficient of the left and right wheels, it is affected by a turn of the vehicle, and the sign (positive or negative) and value of the probable lateral acceleration G will indicate the direction and degree of the turn. Moreover, when a vehicle is turning, G is a function of the vehicle speed and the turning radius, thus it is corrected by multiplying it by a variable which includes the vehicle speed and other factors.

Formula 1

$$G = \left( \left( \frac{\text{Short-term correction coefficient}}{\text{Long-term correction coefficient}} \right)_L - \left( \frac{\text{Short-term correction coefficient}}{\text{Long-term correction coefficient}} \right)_R \right) \times \text{Variable}$$

where,

G=Probable lateral acceleration

L=Left wheel

R=Right wheel

Variable=Value computed from probable vehicle speed, etc.

In order to clarify the movement of the vehicle, the long-term correction coefficient at the point when a turn is deemed to be doubtful (hereinafter called long-term correction coefficient$_{OLD}$) is used. Specifically, the long-term correction coefficient is fixed at its value at the point when a turn is deemed to be doubtful, and for the short-term correction coefficient, the most recent value as affected by a turn are substituted into Formula 2 as defined below to compute a revised probable lateral acceleration G'. This revised probable lateral acceleration G' accurately expresses the movement of the vehicle since it uses the long-term correction coefficient$_{OLD}$ fixed at the point when a turn is deemed to be doubtful.

Formula 2

$$G' = \left( \left( \frac{\text{Short-term correction coefficient}}{\text{Long-term correction coefficient}_{OLD}} \right)_L - \left( \frac{\text{Short-term correction coefficient}}{\text{Long-term correction coefficient}_{OLD}} \right)_R \right) \times \text{Variable}$$

where,

G'=Revised probable lateral acceleration

Long-term correction coefficient$_{OLD}$ is the coefficient at the point when a turn is deemed to be doubtful.

Figure 4B:
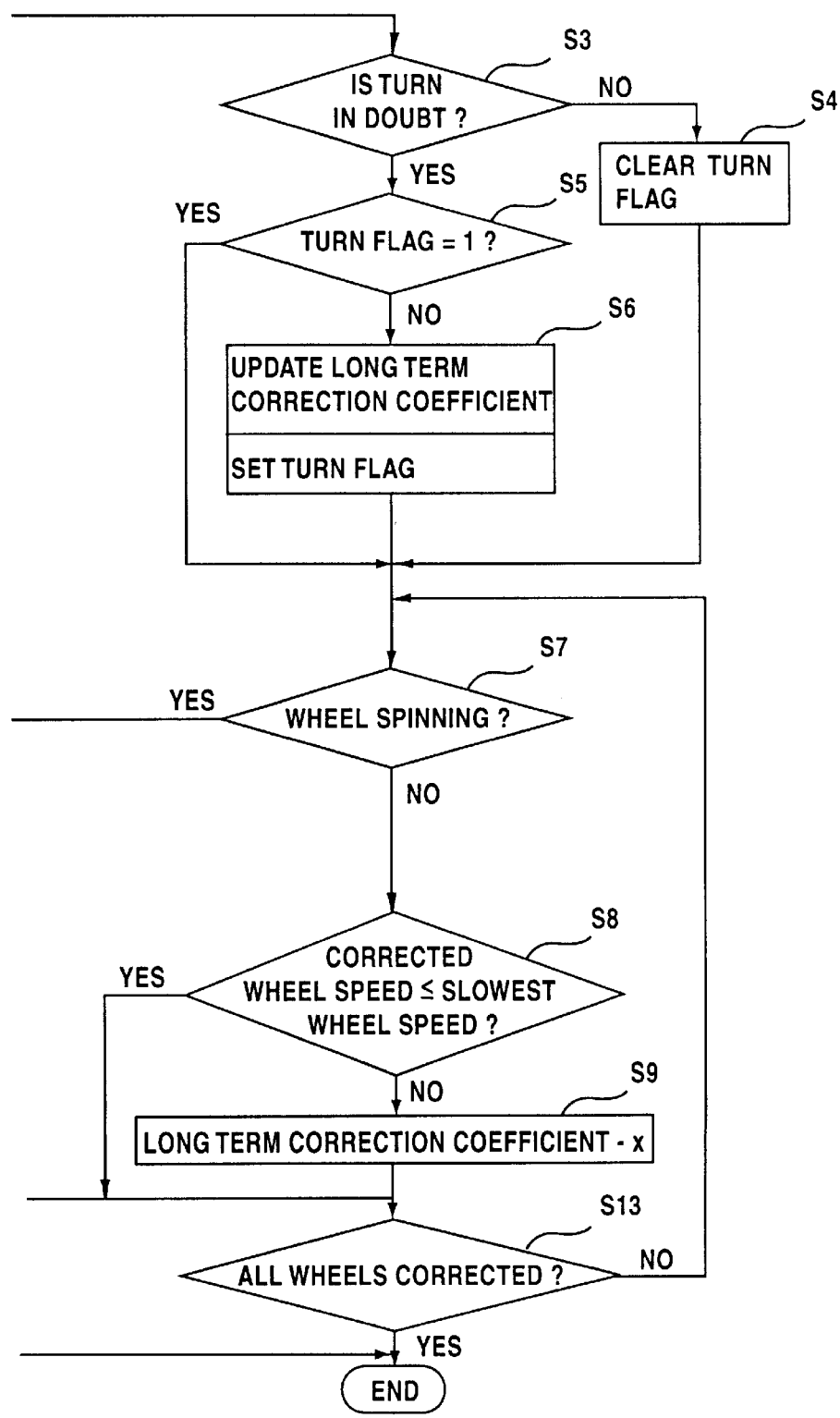
FIG. 4 is a flowchart of the processing steps followed in judging whether a vehicle is making a turn.

Next, the processing to judge a turn is explained, using the flowchart of FIG. 4. This processing is performed at regular intervals of, for example, 0.1 seconds.

1. First, a decision is made as to whether an antilock control action is being performed. If so, no processing to make a decision as to a turn nor to change the correction coefficient is performed. (S1)

2. If an antilock control action is not in process, a revised probable lateral acceleration G' is computed using Formula 2, and a decision is made as to a definitive recognition of a turn. Namely, if the absolute value as computed from Formula 2 is larger than a prescribed value, then the vehicle is deemed to be turning and processing proceeds to Step 14; if the absolute value is smaller than the prescribed value, then a turn is not recognized, and processing proceeds to Step 3. (S2)

3. If a turn is not recognized, then a decision is made as to whether a turn is doubtful. This is done, for example, by monitoring the changes in the short-term correction coefficient from a difference in the speeds of the inner and outer wheels. Namely, if the short-term correction coefficient of two or more wheels is smaller than the prescribed value p, then a turn is deemed doubtful. The same decision is also made if the short-term correction coefficient of one or more wheels is smaller than a prescribed value q, where q<p. (S3)

4. If a turn is not in doubt, the turn flag is cleared, and processing proceeds to Step 7. (S4)

5. If a turn is deemed doubtful, the turn flag is checked, and if the turn flag equals "1", processing proceeds to Step 7. (S5)

6. If the turn flag does not equal "1", the current value of the "long-term correction coefficient$_{OLD}$" register is replaced with the most recent long-term correction coefficient, and "1" is set in the turn flag. In this step, the long-term correction coefficient$_{OLD}$ is updated. (S6)

7. A decision is made as to whether or not a wheel is over-slipping. (S7)
8. If the wheel is not over-slipping, the corrected wheel speed, obtained by multiplying the computer wheel speed by the correction coefficient, is compared with the slowest wheel speed, and if the corrected wheel speed is less than or equal to the slowest wheel speed, then processing proceeds to Step 13. (S8)
9. If the corrected wheel speed is greater than the slowest wheel speed, then a prescribed value "x" is deducted from the long-term correction coefficient. In this step, the long-term correction coefficient is updated. (S9)
10. If a wheel is judged to be over-slipping in Step 7, then a decision is made as to whether its corrected wheel speed is greater than the speed of the radially opposite wheel (S10) and of the axially opposite wheels (S11). In either case, if the corrected wheel speed is less than or equal to the other wheel speed, then processing proceeds to Step 13. (S10), (S11)
11. In either case, if the corrected wheel speed is greater than the other wheel speed, a prescribed value "x" is deducted from the long-term correction coefficient, and processing proceeds to Step 13. (S12)
12. A check is made as to whether the processing has been performed for all wheels; if not, then processing returns to Step 7, and if all wheels have been processed, then processing terminates. (S13)
13. If a turn has been recognized in Step 2, a decision is made as to whether the wheel with the slowest speed is an inner wheel (S14), and if so, the slowest wheel speed is set as the reference wheel speed (S15). Or, if the wheel with the slowest speed is not an inner wheel, the sum of the slowest wheel speed plus the difference between the outer wheel speed and inner wheel speed, is set as the reference wheel speed (S16). (S14), (S15), (S16)
14. A decision is made as to whether the corrected wheel speed is greater than the reference wheel speed; if the corrected wheel speed is less than or equal to the reference speed, then processing proceeds to Step 19. (S17)
15. If the corrected wheel speed is greater than the reference speed, then a prescribed value "x" is deducted from the long-term correction coefficient. (S18)
16. A check is made as to whether the processing has been performed for all wheels; if not, then processing returns to Step 14, and if all wheels have been processed, then processing terminates. (S19)

Next, the control process after the decision-making processing to determine whether the vehicle is making a turn, is explained.

Figure 5:
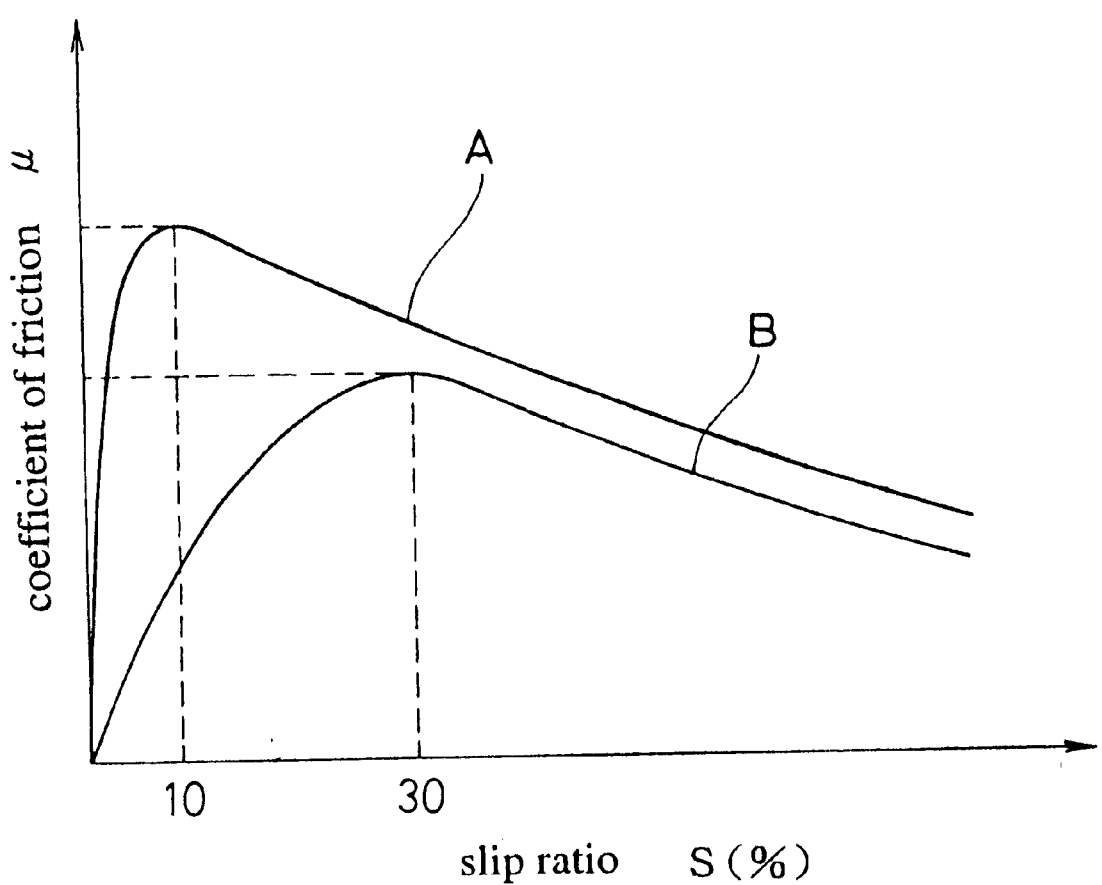
FIG. 5 illustrates the characteristic curves of the coefficient of friction plotted as a function of the slip ratio when the vehicle is advancing in a linear path and when the vehicle is turning.

If the vehicle has been definitively recognized to be turning, then the vehicle is controlled to make a stable turn. For example, the coefficient of friction of the vehicle with the road surface will vary as a function of the state of the turn to result in a curve as shown in FIG. 5. In this graph, the X-axis indicates the slip ratio ((Vehicle body speed−wheel speed)/wheel speed), and the Y-axis indicates the coefficient of friction. If the vehicle is advancing in a straight path, the coefficient will vary with the state of the road surface and other factors, but in general, it varies as characterized by Curve A, wherein the coefficient of friction is large for small slip ratio values. In contrast, if the vehicle is making a turn, the variation of the coefficient of friction is characterized by Curve B, where the peak value of the coefficient of friction occurs for a larger slip ratio than for a linearly-advancing vehicle; for example, the peak shifts from a slip ratio of 10% to approximately 30%. Accordingly, if a turn is definitively recognized, the threshold value for an antilock control operation is updated to be larger than the slip ratio. Or, if the probable lateral acceleration G is small, then the vehicle is deemed not to be turning, in which case, the threshold value is changed to be smaller than the slip ratio, in order to increase the braking force.

A correction for a mini tire is made automatically as well, since the computed wheel speed as computed from the wheel speed sensors are multiplied by the long-term correction coefficient to correct the wheel speed. For example, if a turn is not recognized during the decision-making process of a doubtful turn, the most recent long-term correction coefficient derived from a periodic computation is used to correct the wheel speed. Accordingly, the corrected wheel speed will approximate the actual wheel speed, and an accurate antilock control operation can be performed.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A method for controlling a vehicle comprising: measuring the speed of each wheel of the vehicle; periodically computing a short-term correction coefficient and a long-term correction coefficient for the left and right wheels; deriving the difference between the ratio of the short-term correction coefficient to the long-term correction coefficient for the left and right wheels; computing a probable lateral acceleration G from the difference; computing a revised probable lateral acceleration G' by which to judge the actual turn state using a value of the long-term correction coefficient at a threshold point at which a turn is deemed doubtful and a most recent short-term correction coefficient; and, if a turn is judged not to have been made, controlling the vehicle using the most recent long-term correction coefficient.

2. A method as claimed in claim 1 for controlling a vehicle in which a mini tire is mounted on one of said wheels as a spare tire, wherein if a turn is judged not to have been made, the vehicle is controlled by using the most recent long-term correction coefficient to correct for the mounted mini tire.

3. A method for controlling a vehicle as claimed in claim 1, wherein if a turn is judged not to have been made, any antilock brake control operation is performed using the most recent long-term correction coefficient.

\* \* \* \* \*